3,721,700
FLUORINATED POLYGLYCOL DERIVATIVES
AND THEIR PREPARATION
Erich Schuierer and Dieter Hoffmann, Burghausen, Salzach, Germany, assignors to Farbwerke Hoechst Aktiengesellschaft vormals Meister Lucius & Bruning, Frankfurt am Main, Germany
No Drawing. Filed Aug. 26, 1970, Ser. No. 67,278
Claims priority, application Germany, Sept. 17, 1969,
P 19 46 956.8
Int. Cl. C07c 125/06
U.S. Cl. 260—471 C      11 Claims

ABSTRACT OF THE DISCLOSURE

Adducts from fluoroalkanols, toluene diisocyanates and polyethylene glycols are useful for rendering textiles oil- and water repellent and achieve the "soil release effect." Furthermore, they are dispersing agents for oil- and water repellent polymers made of adducts from said fluoroalkanols, toluene diisocyanates and ethylene imine.

---

The present invention relates to novel addition products of fluoroalkanols, toluene diisocyanates and polyethylene glycols. A further object of this invention is a process for preparing said novel compounds. Still further object of the present invention is the use of the new compounds as textile finishing agents and as dispersing agents for similar textile finishing agents or processes for rendering textiles oil- and water repellent and for achieving the so-called "soil release effect." Further objects of this invention are a process for dispersing polymer adducts of fluoroalkanols, toluene diisocyanates and ethylene imine with said novel compounds, the dispersions so-obtained and a process for finishing textiles with said dispersions. Still further objects of the invention will appear to anyone skilled in the art from the following disclosure.

The present invention relates to fluorinated compounds of the general formula

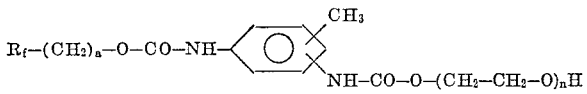

wherein $R_f$ represents a perfluorinated alkyl radical having 3 to 12 carbon atoms, preferably 4 to 10, especially 6 to 10 carbon atoms, $n$ represents a number of about 4 to 70 and $a$ represents 1 or 2. These compounds are suitable, in form of aqueous solutions, to impart to textiles besides oil and water repellent properties, the so-called soil release effect which will be described in detail hereinafter.

Condensation products of perfluorinated aliphatic alcohols with toluene-diisocyanates, as described for example in French patent specification No. 1,438,617, result in products, having excellent water- and oil-repellent properties, but which are difficult to use due to their sensibility towards water.

It has now been found that this disadvantage can be eliminated and an excellent new textile finishing agent is obtained having a good solubility in water and at the same time outstanding water- and oil-repellent properties, by condensating the known condensation products of di- and tetra-hydroperfluoroalkanols and toluene-diisocyanate in the molar ratio of from about 1:1 to 1:1.5, preferably of 1:1, with polyethylene-glycols having a molar weight of from about 200 to about 3000, preferably from 1000 to 2000.

The reaction proceeds according to the following scheme:

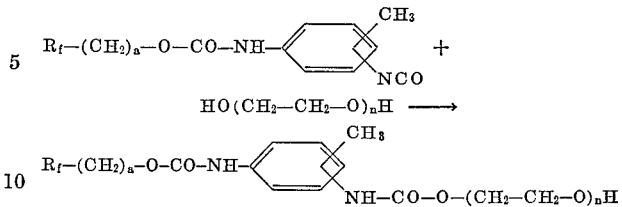

($R_f$, $n$ and $a$ have the above meanings)

Condensation is effected at about 70 to 120° C.

For preparing the fluorinated reaction components, the starting material is toluene-diisocyanate which is reacted according to the French patent specification No. 1,438,617 with fluoro-alkanols in a molar ratio of 1:1. It is known from experience that the solubility of the new fluorinated products in water increases with the molar weight of the polyethylene-glycol used; in the case of a diurethane derived from a polyglycol having a molar weight of about from 200 to 300, only 1–2% by weight dissolve in water, whereas in the case of diurethanes derived from polyglycols of about 2000–3000 molar weight units, there may be prepared clear 5% to 20% solutions which reduce the surface tension of water. The products obtained according to this invention, depending on the molar weight of the polyethylene-glycol employed, may render textiles oil- and water- repellent and impart to them so-called soil release properties. They display optimal properties when polyethylene-glycols of a molecular weight of about 1000 are used, as stated in Table 1 (below).

Another advantage of the novel fluorinated polyethyleneglycol derivatives is that they can disperse water-insoluble fluorinated polymers of an intense oil- and water repelling effect in water and at the same time render hydrophilic the fluorinated condensation components used, depending on the length of their polyethylene-glycol chain, without considerably reducing the oil repellency. As polymers there may be considered above all polymeric fluorinated ethylene-imine derivatives, obtainable by addition of ethylene-imine to the aforementioned isocyanates having the following structure:

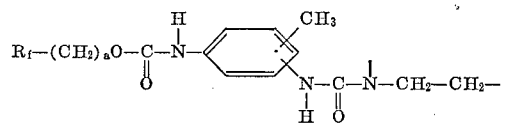

($R_f$ and $a$ are defined as above), which may be converted into stable aqueous dispersions. In this case, there is advantageously used as dispersing agent an addition product of a polyethylene-glycol having a molar weight of about 1000. In the series of the new products according to this invention, optimal results are obtained as concerns the three properties: solubility in water, oil-repelling capacity on textiles and fastness of this finishing agent to washing.

In the preparation of the aqueous dispersions of the fluorinated ethylene-imine-derivatives, two methods have turned out to be particularly advantageous:

(1) The fluorinated polymeric ethylene-imine compound is heated at about 100° C. for not more than 10 minutes, in the presence of the fluorinated polyglycol derivative according to this invention as dispersing agent, in the weight ratio of about 1:1 to 1:3, and converted into a viscous paste. This paste is diluted at about 80–100° C. by addition of or to water, until a dispersion having a solids content of about 30% is obtained. This may be diluted without difficulty with water to reach a solids content of about 1–10% at about 25° C.

(2) The fluorinated monomeric ethylene-imine compound is melted at 70–100° C. for about 30 minutes with the fluorinated polyglycol derivative in a weight ratio of about 1:1 to 1:3 in the presence of about 0.5 to 1% by weight of boron trifluoride-dioxane adduct and is converted into a viscous paste. This paste may be converted, as stated sub (1), into a solid dispersion by addition of or to water.

The excellent properties of the products according to the invention are illustrated by the following examples and test results.

EXAMPLE 1

0.1 mol of 1,1-dihydro-perfluoro-octanol-(1) was mixed in small portions while stirring at 70–100° C., in a nitrogen atmosphere, with 0.1 mol of a commercial toluene-diisocyanate. Then the reaction mixture was reacted at the same temperature, with 0.1 mol of a polyethylene-glycol having a molar weight of about 200, and stirring was continued for about 1 hour at 100–110° C. After cooling, a colorless paste having a heated softening point beneath 40° C. was obtained.

EXAMPLE 2

The reaction was carried out as described in Example 1, employing polyethylene-glycol of a molecular weight of 400 as condensation component. After cooling, a paste was obtained the softening point of which was beneath 45° C.

EXAMPLE 3

A condensation product was prepared as stated in Example 1, employing polyethylene-glycol of a molecular weight of about 600. Similar to the preceding examples a colorless soft wax was obtained, the softening point of which was between about 45° and 50° C.

EXAMPLES 4–6

Condensation products were prepared in analogy to the preceding examples, using polyethylene-glycols of the molecular weights 1000, 2000 and 3000. In these cases, the condensation mixture was reheated at 110–120° C. Solid waxes were obtained having softening points of 45–60° C.

EXAMPLE 7

0.1 mol of 1,1,2,2-tetrahydro-perfluoro-hexanol-(1) was mixed in small portions while stirring at 50–90° C. in an atmosphere of nitrogen, with 0.1 mol of toluene-diisocyanate. Subsequently, the reaction mixture was reacted at 80–100° C. with 0.1 mol of polyethylene-glycol having a molar weight of about 1000. After cooling, a colorless paste with a softening point of 39–41° was obtained.

EXAMPLE 8

The reaction was carried out as described in Example 7, using 1,1,2,2-tetrahydro-perfluoro-octanol-(1). After cooling, a paste with a softening point of 45–47° C. was obtained.

EXAMPLE 9

The reaction was carried out as described in Example 7, using 1,1,2,2-tetrahydro-perfluoro-decanol-(1) and a polyethylene-glycol having a molar weight of about 2000. A colorless paste was obtained having a softening point of 50–52° C.

EXAMPLE 10

The reaction was carried out as described in Example 7, using 1,1,2,2-tetrahydro-perfluoro-dodecanol-(1) and a polyethylene-glycol having a molar weight of about 2000. A solid colorless substance with a softening point of 83–85° C. was obtained.

EXAMPLE 11

100 g. of a condensation product obtained following Example 4 were heated for 10 minutes at 110° C. with 100 g. of a polymerizate, obtained by polymerization of the adduct of ethylene-imine on the condensation product of 1,1-dihydroperfluoro-octanol-(1) and toluene-diisocyanate by means of $BF_3$-dioxane and corresponding to the formula:

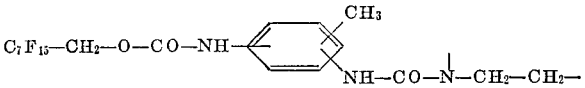

(melting point 90° C.), and was converted into a viscous paste. Into this paste, 466 g. of water were introduced while stirring at 90° C., and a 30% aqueous dispersion resulted. The colorless dispersion obtained could be further diluted at 25° C. at any ratio desired (for example to 10% and 1% of active ingredient).

EXAMPLE 12

70 g. of the product obtained following Example 4, were heated for 30 minutes to 70–100° C. with 70 g. of a monomeric fluorinated ethylene-imine derivative of the formula

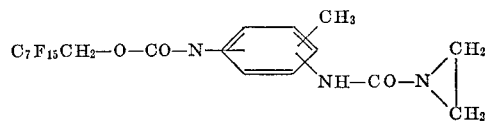

obtained from the ethylene-imine adduct of the condensation product of dihydroperfluoro-octanol and toluene-diisocyanate, under addition of 1 g. of $BF_3$-dioxane, and converted into a viscous paste. At about 90° C., 420 ml. of water were introduced while stirring into this paste and a 25% aqueous dispersion resulted.

EXAMPLE 13

225 g. of the product obtained as in Example 8 were heated for about 90 minutes to 80–100° C. with 225 g. of a mixture of monomeric fluorinated ethylene-imines consisting of equal parts of 75 g. of the formula

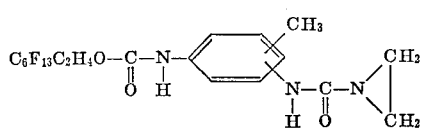

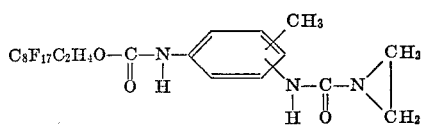

and

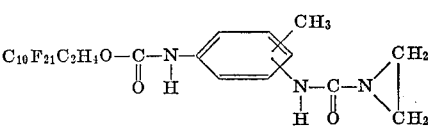

which were obtained from the corresponding fluorinated alcohols, toluene-diisocyanate and ethylene-imine, by addition of 2.3 g. of $BF_3$-dioxane and was converted into a viscous paste. At 95–100° C., 135 g. of $H_2O$ were introduced into this paste.

TEST METHODS AND RESULTS

Samples of cotton material were finished with the new fluorinated condensation products or aqueous polymeric dispersions and tested for:

oil- and water-repellency
fastness to solvents and
soil release capacity ("easy-to-clean"-finish).

The samples were prepared according to the following process:

(A) endless fabric strip was passed through a 1% solution of the product to be tested in acetone, until the solvent was completely evaporated and fluorinated product employed was quantitatively absorbed by the material (=pick-up of about 1%, calculated on the material weight). By an after-treatment at 130° C. the necessary fixation of the active agent on the fibre was obtained.

(B) The fabric samples were submersed into aqueous dispersions of the active substance and squeezed off. For this purpose, the highly concentrated dispersions of the new fluorinated products, as described in the Examples 11 to 13, were diluted with water to reach an active ingredient content of 1%. The submersed and dried samples were exposed at 150° C. for about 5 minutes to a thermal after-treatment. The active substance coating amounted to 0.9–1%, calculated on the material weight.

The oil-repellency of the fabrics finished in this way was tested with n-heptane-paraffin-oil mixtures according to the criterion given in U.S. patent specification No. 3,362,782 with the following scale of values:

| Oil repellency value | Percent by volume of n-heptane | Percent by volume of paraffin oil DAB 6* |
|---|---|---|
| 50 | 0 | 100 |
| 60 | 10 | 90 |
| 70 | 20 | 80 |
| 80 | 30 | 70 |
| 90 | 40 | 60 |
| 100 | 50 | 50 |
| 110 | 60 | 40 |
| 120 | 70 | 30 |
| 130 | 80 | 20 |

*DAB = Deutsches Arzneibuch.

In order to test water repellency (water-repelent effect), water drops were applied with a pipet on the material to be tested and judged after a reaction time of 3 minutes using the following characteristics:

+ no wetting
± slight wetting
— immediate wetting

When testing the fastness to washing, the fabric samples were washed with a commercially available detergent up to 5 times at 100° C.

For testing the soil replease capacity, following soiling deposits were used:

(a) soiled motor oil
(b) olive oil and 1% by weight of the red dyestuff Colour Index 26,100

The separately applied soiling deposits were contacted for 15 minutes at 25° C. with the textile samples finished with the chemicals according to the invention. (Size of the samples 7 x 7 cm.; amount of the soiling deposits 0.1 ml.). The soiled fabric samples were, after covering them with glass, exposed for 30 minutes to a pressure of 1 kg./49 cm.² and subsequently aged for 1 hour at 80° C. in a drier. Then the fabric samples were washed at 100° C. with a commercially available detergent, and the washing resistance of the soil was determined.

For testing the fastness to washing of the soil release finishing, the samples were washed 5 times as described above and then soiled.

The tests carried out according to these methods provided the values listed in Table 1 for cotton with dispersing agents according to Examples 1 to 10, employing a pick-up of 1%, calculated on the fabric weight. The numbers indicated in brackets represent the molar weight of the polyethylene-glycol used for the preparation of the dispersing agents.

TABLE 1
[Pre-treatment according to method A]

| Example | Oil and water repellency | | | |
|---|---|---|---|---|
| | Not washed | Washed 1 time | Washed 2 times | Washed 5 times |
| 1 (200) | 120± | 90— | 80— | 60— |
| 2 (400) | 120± | 100— | 80— | 50— |
| 3 (600) | 110± | 80— | 50— | 0— |
| 4 (1,000) | 110± | 80— | 60— | 0— |
| 5 (2,000) | 60–80± | 60 | — | — |
| 6 (3,000) | 60–80± | 60 | — | — |
| 7 (1,000) | 50— | 0 | 0 | 0 |
| 8 (1,000) | 80— | 60— | 0 | 0 |
| 9 (2,000) | 60–80± | 60 | — | — |
| 10 (2,000) | 70–80± | 60 | — | — |

In all cases soil release capacity was good to very good.

Explanation of symbols +, ± and — in col. 5.

A concerns the use of the products according to the invention for finishing textiles, the following results were obtained according to Table 1:

(1) The lower the molar weight of the polyethyleneglycol employed, the higher was the oil repellency of the unwashed samples.

(2) Fastness to washing of the finishing decreased with the length of the polyethylene-glycol chain, corresponding to the increasing solubility in water.

(3) The soil release capacity was, in all cases, good to very good; it was generally favored by rendering the fibre hygroscopic.

TABLE 2
[Pre-treatment according to method B]

| Example | Oil and water repellency | | | | Soil release capacity |
|---|---|---|---|---|---|
| | Not washed | Washed 1 time | Washed 2 times | Washed 5 times | |
| Example 11 | 100+ | 100+ | 100+ | 100+ | Good. |
| Example 12 | 120+ | 100+ | 100+ | 100+ | Very good. |
| Example 13 | 110± | 100— | 80–90— | — | Do. |
| Comparison with commercially available product.* | 90+ | 70— | 70— | 0— | Good. |

*Commercial product FC 218® of Messrs. 3M Company.

NOTE.—Symbols as in Table 1.—®Registered trademark.

We claim:
1. A compound of the formula

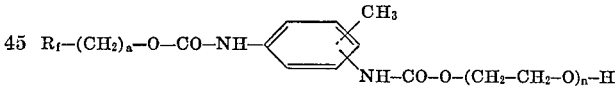

in which $R_f$ is perfluoroalkyl of 3 to 12 carbon atoms, $a$ is 1 or 2 and $n$ is a number of about 4 to about 70.

2. The compound as claimed in claim 1, wherein $R_f$ is n-perfluoroalkyl of 3 to 12 carbon atoms.

3. The compound as claimed in claim 1, wherein $R_f$ is n-perfluoroalkyl of 4 to 10 carbon atoms.

4. The compound as claimed in claim 1, wherein $R_f$ is n-perfluoroalkyl of 6 to 10 carbon atoms.

5. The compound as claimed in claim 1, wherein $n$ is a number of about 20 to about 45.

6. The compound as claimed in claim 1, wherein $R_f$ is n-$C_7F_{15}$, $a$ is 1 and $n$ is about 22.

7. The compound as claimed in claim 1, wherein $R_f$ is n-$C_4F_9$, $a$ is 2 and $n$ is about 22.

8. The compound as claimed in claim 1, wherein $R_f$ is n-$C_6F_{13}$, $a$ is 2 and $n$ is about 45.

9. The compound as claimed in claim 1, wherein $R_f$ is n-$C_8F_{17}$, $a$ is 2 and $n$ is about 45.

10. The compound as claimed in claim 1, wherein $R_f$ is n-$C_{10}F_{21}$, $a$ is 2 and $n$ is about 45.

11. Process for the preparation of a compound of the formula

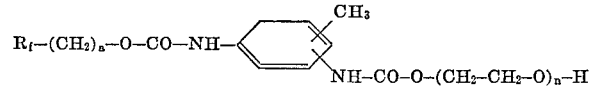

in which $R_f$ is perfluoroalkyl of 3 to 12 carbon atoms, $a$ is 1 or 2 and $n$ is a number of about 4 to about 70, which comprises reacting a toluene diisocyanate with a perfluoroalkanol in a molar ratio of from about 1:1 to 1:1.5, the perfluoroalkanol being of the formula $$R_f-(CH_2)_a-OH$$

in which $R_f$ and $a$ are as defined above, and a polyethylene glycol having a molar weight of from about 200 to about 3000 and being of the formula $$HO-(CH_2-CH_2-O)_n-H$$

in which $n$ is as defined above, at a temperature of about 70 to 120° C.

References Cited

UNITED STATES PATENTS 3,105,845  10/1963  Fetterly et al. _____ 260—471 C

HENRY R. JILES, Primary Examiner

L. A. THAXTON, Assistant Examiner

U.S. Cl. X.R.

117—121; 268—239 E